United States Patent
Liljestrand et al.

(10) Patent No.: US 9,222,385 B2
(45) Date of Patent: Dec. 29, 2015

(54) METHOD AND DEVICE PERTAINING TO COOLING OF DOSING UNITS OF SCR SYSTEMS

(75) Inventors: Andreas Liljestrand, Södertälje (SE); Per Bremberg, Södertälje (SE); Ulf Carlsson, Södertälje (SE); Lars Eriksson, Järna (SE); Erik Gustafsson, Södertälje (SE)

(73) Assignee: SCANIA CV AB (SE)

( * ) Notice: Subject to any disclaimer, the term of this patent is extended or adjusted under 35 U.S.C. 154(b) by 419 days.

(21) Appl. No.: 13/704,743

(22) PCT Filed: Jun. 20, 2011

(86) PCT No.: PCT/SE2011/050783
§ 371 (c)(1),
(2), (4) Date: Mar. 26, 2013

(87) PCT Pub. No.: WO2011/162688
PCT Pub. Date: Dec. 29, 2011

(65) Prior Publication Data
US 2013/0186069 A1    Jul. 25, 2013

(30) Foreign Application Priority Data
Jun. 21, 2010   (SE) ..................... 1050642

(51) Int. Cl.
*F01N 3/00*  (2006.01)
*F01N 3/10*  (2006.01)
*F01N 3/20*  (2006.01)
*F01N 9/00*  (2006.01)

(52) U.S. Cl.
CPC .............. *F01N 3/10* (2013.01); *F01N 3/208* (2013.01); *F01N 9/00* (2013.01); *F01N 2610/02* (2013.01); *F01N 2610/11* (2013.01); *Y02T 10/24* (2013.01); *Y02T 10/47* (2013.01)

(58) Field of Classification Search
CPC ....... F01N 3/10; F01N 3/208; F01N 2610/02; F01N 2610/11; F01N 9/00; Y02T 10/24; Y02T 10/47
USPC .................... 60/274, 286, 295, 303
See application file for complete search history.

(56) References Cited

U.S. PATENT DOCUMENTS

| | | | |
|---|---|---|---|
| 7,980,063 B2 * | 7/2011 | Cooke | 60/286 |
| 2007/0092413 A1 * | 4/2007 | Hirata et al. | 422/177 |

FOREIGN PATENT DOCUMENTS

| | | | |
|---|---|---|---|
| DE | 10 2007 000 666 A1 | | 7/2008 |
| DE | 102007000666 | * | 7/2008 |
| JP | 9-96212 | | 4/1997 |
| WO | WO 2007/131808 A1 | | 11/2007 |
| WO | WO 2009/050948 A1 | | 4/2009 |

OTHER PUBLICATIONS

International Search Report dated Oct. 5, 2011 issued in corresponding international patent application No. PCT/SE2011/050783.

* cited by examiner

*Primary Examiner* — Jesse Bogue
*Assistant Examiner* — Diem Tran
(74) *Attorney, Agent, or Firm* — Ostrolenk Faber LLP

(57) ABSTRACT

A method pertaining to an SCR system for exhaust cleaning, includes deciding about a need, after cessation of an exhaust flow, to cool a reducing agent dosing unit (250) by a reducing agent supplied to it, and includes predicting a temperature pattern of the dosing unit (250) as a basis for deciding about the need and predicting whether a predetermined temperature of the dosing unit will be reached after cessation of exhaust flow. Also a computer program product containing program code (P) for implementing the method, an SCR system and a motor vehicle which is equipped with the SCR system are disclosed.

20 Claims, 4 Drawing Sheets

METHOD AND DEVICE PERTAINING TO COOLING OF DOSING UNITS OF SCR SYSTEMS

CROSS-REFERENCE TO RELATED APPLICATIONS

The present application is a 35 U.S.C. §§371 national phase conversion of PCT/SE2011/050783, filed Jun. 20, 2011, which claims priority of Swedish Application No. 1050642-6, filed Jun. 21, 2010, the contents of which are incorporated by reference herein. The PCT International Application was published in the English language.

TECHNICAL FIELD

The present invention relates to a method pertaining to an SCR system for exhaust cleaning. The invention relates also to a computer programme product containing programme code for a computer for implementing a method according to the invention. The invention relates also to an SCR system for exhaust cleaning and a motor vehicle which is equipped with the SCR system.

BACKGROUND

Vehicles today use, for example, urea as reductant in SCR (selective catalytic reduction) systems which comprise an SCR catalyst in which said reductant and NOx gas can react and be converted to nitrogen gas and water. Various types of reductants may be used in SCR systems. AdBlue is an example of a commonly used reductant.

One type of SCR system comprises a container which holds a reductant. The SCR system has also a pump adapted to drawing said reductant from the container via a suction hose and to supplying it via a pressure hose to a dosing unit situated adjacent to an exhaust system of the vehicle, e.g. adjacent to an exhaust pipe of the exhaust system. The dosing unit is adapted to injecting a necessary amount of reductant into the exhaust pipe upstream of the SCR catalyst according to operating routines which are stored in a control unit of the vehicle. To make it easier to regulate the pressure when there are small or no dosing amounts, the system comprises also a return hose which runs back to the container from a pressure side of the system. This configuration makes it possible to cool the dosing unit by means of the reductant which, during cooling, flows from the container via the pump and the dosing unit and back to the container. The dosing unit is thus provided with active cooling. The return flow from the dosing unit to the container may be substantially constant and is currently not controlled or regulated by means of appropriate valves or such units.

As the dosing unit is currently situated adjacent to the vehicle's exhaust system which becomes warm during operation of the vehicle, e.g. depending on the load, there is risk of the dosing unit becoming overheated. Overheating of the dosing unit may entail degradation of its functionality, potentially impairing its performance.

The dosing unit currently comprises electrical components, certain of them being provided with a circuit card. Said circuit card may for example be adapted to controlling the dosing of AdBlue to the vehicle's exhaust system. For various reasons, these electrical components are sensitive to high temperatures. Too high temperatures of the dosing unit may result in degradation of the electrical components, potentially leading to expensive repairs at a service workshop. Moreover, the reductant present in the dosing unit may at least partly crystallise at too high temperatures, potentially leading to obstruction of the dosing unit. It is therefore of the utmost importance that the temperature of the dosing unit of the SCR system should not exceed a critical level.

Cooling the dosing unit of a vehicle's SCR system currently takes place continuously during the vehicle's ordinary operation as a result of the reductant circulating within the SCR system as indicated above. Cooling the dosing unit during operation of the vehicle currently works satisfactorily.

After operation of the vehicle a large amount of thermal energy caused by its operation is stored in primarily the exhaust system. This thermal energy may be led to the dosing unit from, for example, a silencer and the SCR catalyst and may warm the dosing unit to a temperature which exceeds a critical value.

When the vehicle is switched off and the exhaust flow in the exhaust system consequently ceases, the reductant dosing unit is cooled for a predetermined time, e.g. about 30 minutes, by said reductant in the same way as during ordinary operation.

This arrangement entails certain disadvantages. One is a relatively large amount of energy used to power the pump in the SCR system after the vehicle has been switched off. Any vehicle battery used to power the pump of the SCR system might thus be discharged or reach an undesirably low charge level.

Another disadvantage of the dosing unit being cooled in the same way as during ordinary operation is that the pump of the SCR system emits disturbing noise which for example a driver of the vehicle may find irritating, particularly when he/she has to sleep in the cab after a driving run or is in the immediate vicinity of the vehicle.

There is thus a need to improve current methods for cooling the dosing unit in the SCR system after the vehicle has been switched off, in order to reduce or eliminate the above disadvantages.

DE 102007000666 A1 refers to a device for supply of reducing agent to an exhaust duct during catalytic exhaust cleaning and discusses cooling of an injection valve for reducing agent after the engine and consequently the exhaust flow have been switched off. The arrangement in DE 102007000666 A1 comprises a cooling jacket which for cooling purposes surrounds the injection valve and is adapted to having reducing agent flow through it. The primary focus here is on the temperature of the reducing agent, mainly by measurement.

SUMMARY OF THE INVENTION

An object of the present invention is to propose a novel and advantageous method for improving the performance of an SCR system.

Another object of the present invention is to propose a novel and advantageous SCR system and a novel and advantageous computer programme for improving the performance of an SCR system.

An object of the present invention is to propose a novel and advantageous method for effecting cooling of a dosing unit of an SCR system after cessation of an exhaust flow therein.

Another object of the invention is to propose a novel and advantageous SCR system and a novel and advantageous computer programme for effecting cooling of a dosing unit of an SCR system after cessation of an exhaust flow in the SCR system.

A further object of the invention is to propose a method, SCR system and a computer programme for reducing the risk that a dosing unit in an SCR system might become overheated after cessation of an exhaust flow in the SCR system.

A further object of the invention is to propose an alternative method, an alternative SCR system and an alternative computer programme for reducing the risk that a dosing unit in an SCR system might become overheated after cessation of an exhaust flow in the SCR system.

These objects are achieved with a method pertaining to SCR systems for exhaust cleaning according to the disclosure herein.

An aspect of the invention proposes a method pertaining to SCR systems for exhaust cleaning, comprising the steps of:
- deciding about a need, after cessation of an exhaust flow, to cool a reducing agent dosing unit, which forms part of the SCR system, by means of reducing agent supplied to the dosing unit, and
- predicting a temperature pattern of said dosing unit as a basis for deciding about said need, and predicting accordingly whether a predetermined temperature of the dosing unit will be reached after said cessation of exhaust flow.

A calculation model adapted to calculating a future maximum temperature which the dosing unit of the SCR system, supposing energy stored in the dosing unit, will reach at the cessation of the exhaust flow may be used to achieve a reduced impact of the SCR system. A calculation model adapted to calculating a future maximum temperature which the dosing unit, supposing energy stored in various portions of the SCR system, will reach when the exhaust flow ceases may be used to achieve a reduced impact of the SCR system. The calculation model may be adapted to sampling temperatures of the dosing unit of the SCR system just before and/or after cessation of the exhaust flow and be able on the basis thereof to predict whether the dosing unit will reach temperatures which are too high and might damage it. If it is determined that too high a temperature of the reducing agent dosing unit is very likely to be reached, its cooling by reducing agent may be maintained at any suitable level. The calculation model is adapted to sampling temperatures of various portions of the SCR system just before and/or after cessation of the exhaust flow and be able on the basis thereof predict whether the dosing unit will reach temperatures which are too high and might damage it. If it is determined that too high a temperature of the reducing agent dosing unit is very unlikely to be reached, its cooling by reducing agent may be stopped automatically. Thus the number of occasions which entail continued cooling of the reducing agent dosing unit by reducing agent upon cessation of the exhaust flow can be reduced, which is advantageous from several points of view, e.g. in avoiding unnecessary use of electrical energy to run a feed device for said reducing agent in the SCR system.

Predicting a temperature pattern of the dosing unit makes it possible for operation of the reducing agent feed device in the SCR system to be controlled in an optimum way with regard to use of electrical energy. Predicting a temperature pattern of the dosing unit and automatically deciding whether continued operation of the feed device should cease makes it possible to avoid unnecessary cooling of the dosing unit.

Said predetermined temperature may be a temperature which is critical for the function of the dosing unit. This functionally critical temperature is a temperature at which, for example, electronic components of the dosing unit might sustain so much damage that their functionality would be degraded or eliminated. Setting said predetermined temperature at a suitable value represents a robust method for reducing the risk of a dosing unit in an SCR system becoming overheated after cessation of an exhaust flow in the SCR system.

Said at least one portion of said SCR system may comprise any from among an SCR catalyst, a silencer or the reducing agent. In particular, it is advantageous to predict a temperature pattern of the dosing unit. If a temperature pattern is predicted for other components of the SCR system, e.g. the SCR catalyst or the silencer, it is possible to model on the basis thereof a predicted temperature pattern for the dosing unit. Said prediction of the temperature pattern of said at least one portion of said SCR system thus makes it possible to determine indirectly a future temperature of the dosing unit. In particular it makes it possible to determine indirectly a future maximum temperature of the dosing unit.

Said prediction of the temperature pattern may entail catering for rewarming effects of at least one portion of the SCR system. Depending on how the SCR system has been operated, different amounts of thermal energy may be stored in different portions of it. This thermal energy may be led to the dosing unit even after cessation of the exhaust flow. An aspect of the invention caters for rewarming effects when modelling a temperature pattern of the dosing unit.

The method may further comprise the step of predicting said temperature pattern of at least one portion of said SCR system by means of a calculation model which comprises a predetermined parameter configuration. The parameter configuration may be any parameter configuration comprising for example a prevailing temperature of the SCR catalyst and/or a prevailing temperature of the silencer and/or a prevailing temperature of the reducing agent or the dosing unit.

The step of deciding about said need may take place before or after said cessation of exhaust flow. Deciding about said need before cessation of the exhaust flow means that a decision about discontinuing cooling of the dosing unit may be taken earlier than if the step of so deciding takes place after said cessation of exhaust flow. Deciding about said need after said cessation of the exhaust flow means that a decision about discontinuing cooling of the dosing unit may be taken on the basis of more updated information than if said need is decided about before cessation of the exhaust flow.

Said reducing agent may be a fluid solution which contains urea.

The method is easy to implement in existing motor vehicles. Software pertaining to an SCR system for exhaust cleaning according to the invention may be installed in a control unit of the vehicle during the manufacture of the vehicle. A purchaser of the vehicle may thus have the possibility of selecting the function of the method as an option. Alternatively, software which comprises programme code for applying the innovative method pertaining to an SCR system for exhaust cleaning may be installed in a control unit of the vehicle on the occasion of upgrading at a service station, in which case the software may be loaded into a memory in the control unit. Implementing the innovative method is therefore cost-effective, particularly since the vehicle need not be provided with any further components or subsystems. Relevant hardware is currently already provided in the vehicle. The invention therefore represents a cost-effective solution to the problems indicated above.

Software comprising programme code for deciding about a need, after cessation of an exhaust flow, to cool a reducing agent dosing unit by means of reducing agent, and for predicting a temperature pattern of at least one portion of said SCR system as a basis for deciding about said need, according to an aspect of the invention, is easy to update or replace. Moreover, different parts of the software comprising programme code for applying the innovative method may be replaced independently of one another. This modular configuration is advantageous from a maintenance perspective.

An aspect of the invention proposes an SCR system comprising a device for exhaust cleaning. The SCR system comprises means for deciding about a need, after cessation of an exhaust flow, to cool a reducing agent dosing unit, which forms part of the SCR system, by means of reducing agent intended to be supplied to the dosing unit, and means for predicting a temperature pattern of said dosing unit as a basis for deciding about said need, and means for predicting whether a predetermined temperature of the dosing unit will be reached after said cessation of exhaust flow.

Said predetermined temperature may be a temperature which is critical for the function of the dosing unit.

Said means for predicting a predetermined temperature of the dosing unit of said SCR system are adapted to predicting a temperature pattern of at least one further portion of said SCR system comprising any from among an SCR catalyst, a silencer or the reducing agent.

Said prediction of temperature pattern of said further at least one portion of said SCR system may make it possible to determine indirectly a future temperature of the dosing unit.

Said prediction of the temperature pattern may entail catering for rewarming effects of at least one portion of the SCR system.

The SCR system may further comprise means for predicting said temperature pattern of at least one portion of said SCR system by means of a calculation model comprising a predetermined parameter configuration.

The means for deciding about said need may be adapted to so deciding before or after said cessation of exhaust flow.

The above objects are also achieved with a motor vehicle provided with the SCR system. The vehicle may be a truck, bus or passenger car.

An advantage of the present invention is that the time when a control unit of the vehicle need not be activated is as often or as long as previously for monitoring and controlling the reducing agent feed device.

An aspect of the invention proposes any suitable platform which comprises an SCR system, e.g. a watercraft. The watercraft may be of any kind, e.g. a motorboat, a steamer, a ferry or a ship.

An aspect of the invention proposes a computer programme pertaining to SCR systems for exhaust cleaning which contains programme code for causing an electronic control unit or another computer connected to the electronic control unit to perform steps according to any of claims 1-8.

An aspect of the invention proposes a computer programme pertaining to SCR systems for exhaust cleaning which contains programme code stored on a computer-readable medium for causing an electronic control unit or another computer connected to the electronic control unit to perform steps according to the disclosure herein.

An aspect of the invention proposes a computer programme product containing a programme code stored on a computer-readable medium for performing method steps according to the disclosure herein when said programme is run on an electronic control unit or another computer connected to the electronic control unit.

Further objects, advantages and novel features of the present invention will become apparent to one skilled in the art from the following details, and also by putting the invention into practice. Whereas the invention is described below, it should be noted that it is not restricted to the specific details described. Specialists having access to the teachings herein will recognise further applications, modifications and incorporations within other fields, which are within the scope of the invention.

BRIEF DESCRIPTION OF THE DRAWINGS

For fuller understanding of the present invention and further objects and advantages of it, the detailed description set out below should be read together with the accompanying drawings, in which the same reference notations denote similar items in the various diagrams, and in which:

FIG. 4$b$ is a more detailed schematic flowchart of a method according to an embodiment of the invention.

DETAILED DESCRIPTION OF THE DRAWINGS

Figure 1:
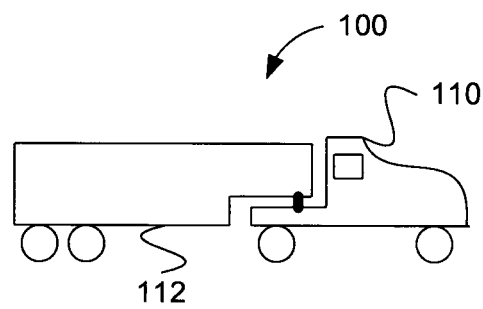
FIG. 1 illustrates schematically a vehicle according to an embodiment of the invention.

FIG. 1 depicts a side view of a vehicle 100. The exemplified vehicle 100 comprises a tractor unit 110 and a trailer 112. The vehicle may be a heavy vehicle, e.g. a truck or a bus. The vehicle may alternatively be a passenger car.

It should be noted that the invention is applicable to any SCR system and is therefore not restricted to SCR systems of motor vehicles. The innovative method and the innovative device according to an aspect of the invention are well suited to other platforms which have an SCR system than motor vehicles, e.g. watercraft. The watercraft may be of any kind, e.g. motorboats, steamers, ferries or ships.

The innovative method and the innovative SCR system according to an aspect of the invention are also well suited to for example, systems which comprise industrial engines and/or engine-powered industrial robots.

The innovative method and the innovative SCR system according to an aspect of the invention are also well suited to various kinds of power plants, e.g. an electric power plant comprising a diesel generator.

The innovative method and the innovative SCR system are well suited to any engine system which comprises an engine and an SCR system, e.g. on a locomotive or some other platform.

The innovative method and the innovative SCR system are well suited to any system which comprises an $NO_x$ generator and an SCR system.

The term "link" refers herein to a communication link which may be a physical connection such as an opto-electronic communication line, or a non-physical connection such as a wireless connection, e.g. a radio link or microwave link.

The term "line" refers herein to a passage for holding and conveying a fluid, e.g. a reducing agent in liquid form. The line may be a pipe of any suitable size. The line may be made of any suitable material, e.g. plastic, rubber or metal.

The term "reductant" or "reducing agent" refers herein to an agent used for reacting with certain emissions in an SCR system. These emissions may for example be NOx gas. The terms "reductant" and "reducing agent" are herein used synonymously. Said reductant according to a version is so-called AdBlue. Other kinds of reductants may of course be used. AdBlue is herein cited as an example of a reductant, but specialists will appreciate that the innovative method and the innovative device are feasible with other types of reductants, subject to necessary adaptations, e.g. adaptations to adequate freezing points for chosen reductants, in control algorithms for executing software code in accordance with the innovative method.

Figure 2:
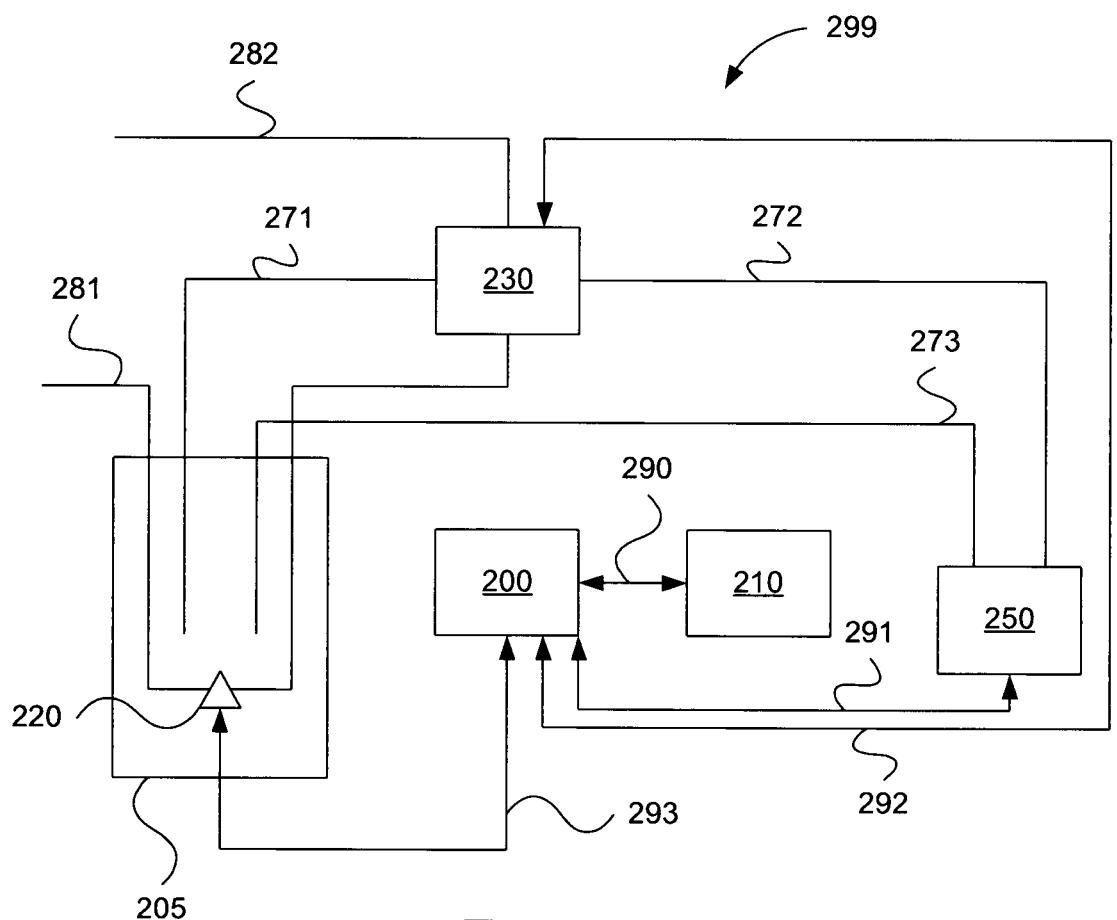
FIG. 2 illustrates schematically a subsystem for the vehicle depicted in FIG. 1, according to an embodiment of the invention.

FIG. 2 depicts a subsystem 299 of the vehicle 100. The subsystem 299 is situated in the tractor unit 110. The subsystem 299 may be part of an SCR system. The subsystem 299 comprises in this example a container 205 arranged to hold a reductant. The container 205 is adapted to containing a suitable amount of reductant and to being replenishable as necessary. The container might accommodate, for example, 75 or 50 liters of reductant.

A first line 271 is adapted to leading the reductant to a pump 230 from the container 205. The pump 230 may be any suitable pump. The pump 230 may be a diaphragm pump provided with at least one filter. The pump 230 is adapted to being driven by an electric motor. The pump 230 is adapted to drawing the reductant from the container 205 via the first line 271 and supplying it via a second line 272 to a dosing unit 250. The dosing unit 250 comprises an electrically controlled dosing valve by means of which a flow of reductant added to the exhaust system can be controlled. The pump 230 is adapted to pressurising the reductant in the second line 272. The dosing unit 250 is provided with a throttle unit against which said pressure of the reductant is built up in the subsystem 299.

The dosing unit 250 is adapted to supplying said reductant to an exhaust system (not depicted) of the vehicle 100. More specifically, the dosing unit 250 is adapted to supplying a suitable amount of reductant in a controlled way to an exhaust system of the vehicle 100. According to this version, an SCR catalyst (not depicted) is situated downstream of a location in the exhaust system where the reductant supply is effected. The amount of reductant supplied in the exhaust system is intended to be used in a conventional way in the SCR catalyst for reducing the amount of undesirable emissions in a known way.

The dosing unit 250 is situated adjacent to, for example, an exhaust pipe which is adapted to leading exhaust gases from a combustion engine (not depicted) of the vehicle 100 to the SCR catalyst. The exhaust system may comprise a silencer (not depicted) arranged in some conventional way. The dosing unit 250 is situated in thermal contact with the exhaust system of the vehicle 100. This means that thermal energy stored in, for example, an exhaust pipe, silencer and SCR catalyst can thus be led to the dosing unit.

The dosing unit 250 is provided with an electronic control card which is adapted to handling communication with a control unit 200. The dosing unit 250 comprises also plastic and/or rubber components which might melt or be otherwise adversely affected as a result of too high temperatures.

The dosing unit 250 is sensitive to temperatures above a certain value, e.g. 120 degrees Celsius. As for example the exhaust pipe, the silencer and the SCR catalyst of the vehicle 100 exceed this temperature value, there is risk that the dosing unit might become overheated during or after operation of the vehicle if not provided with cooling.

A third line 273 runs between the dosing unit 250 and the container 205. The third line 273 is adapted to leading back to the container 205 a certain amount of the reductant fed to the dosing valve 250. This configuration achieves with advantage cooling of the dosing unit 250. The dosing unit 250 is thus cooled by a flow of the reductant as it is pumped through the dosing unit 250 from the pump 230 to the container 205.

A first radiator liquid line 281 is adapted to holding and conveying coolant for an engine of the vehicle 100. The first radiator liquid line 281 is partly situated in the container 205 in order to warm the reductant present therein if the reductant is cold. In this example, the first radiator liquid line 281 is adapted to leading radiator liquid which has been warmed by the vehicle's engine in a closed circuit through the container 205, via the pump 230 and a second radiator liquid line 282 back to the engine of the vehicle 100. According to a version, the first radiator liquid line 281 is configured with a substantially U-shaped portion situated in the container 205, as schematically depicted in FIG. 2. This configuration achieves improved warming of the reductant in the container 205 when the reductant is at too low a temperature to function in a desirable way. It should be noted that the first radiator liquid line 281 may be of any suitable configuration. If the reductant is at a temperature which exceeds a predetermined value, its warming by the radiator liquid is deactivated automatically.

A first control unit 200 is arranged for communication with a temperature sensor 220 via a link 293. The temperature sensor 220 is adapted to detecting a prevailing temperature of the reductant where the sensor is fitted. According to this version, the temperature sensor 220 is situated at a bottom of the substantially U-shaped configuration of the first radiator liquid line 281. The temperature sensor 220 is adapted to continuously sending signals to the first control unit 200 which contain information about a prevailing temperature of the reductant.

According to an alternative, the temperature sensor 220 is situated adjacent to the dosing unit 250 in order to detect a prevailing temperature of the reductant there. The temperature sensor 220 is adapted to detecting at a suitable location within the subsystem 299 a prevailing temperature of the reductant which may serve as a basis for calculating a temperature pattern of the dosing unit to make it possible to control operation of the pump 230 in a suitable way in order to cool the dosing unit by means of said flow of reductant.

The first control unit 200 is arranged for communication with the pump 230 via a link 292. The first control unit 200 is adapted to controlling operation of the pump 230 in order for example to regulate a pressure in the line 272. Accordingly, a return flow of the reductant from the dosing unit 250 to the container 205 may be described as a function of a pressure of the reductant upstream of the dosing unit 250. The first control unit 200 is adapted to regulating a prevailing temperature of the dosing unit by controlling operation of the pump 230.

The first control unit 200 is arranged for communication with the dosing unit 250 via a link 291. The first control unit 200 is adapted to controlling operation of the dosing unit 250 in order for example to regulate the reductant supply to the exhaust system of the vehicle 100. The first control unit 200 is adapted to controlling operation of the dosing unit 250 in order for example to regulate the reductant return supply to the container 205.

The first control unit 200 is adapted, according to a version, to using the signals received which contain information about a prevailing temperature of the reductant at any location in the SCR system as a basis for controlling operation of the pump 230. In particular, the first control unit 200 is adapted, according to a version, to using the signals received which contain a prevailing temperature of the reductant in the region of the temperature sensor 220 as a basis for intermittently controlling operation of the pump 230 at reduced power compared with ordinary operation after cessation of an exhaust flow from the engine.

A second control unit 210 is arranged for communication with the first control unit 200 via a link 290. The second control unit 210 may be detachably connected to the first control unit 200. The second control unit 210 may be a control unit external to the vehicle 100. The second control unit 210 may be adapted to performing the innovative method steps according to the invention. The second control unit 210 may be used to cross-load software to the first control unit 200, particularly software for applying the innovative method. The second control unit 210 may alternatively be arranged for communication with the first control unit 200 via an internal network in the vehicle. The second control unit 210 may be adapted to performing substantially similar functions to those of the first control unit 200, e.g. using the signals received which contain a prevailing temperature of the reductant as a basis for calculating a value for future maximum temperatures of the dosing unit and controlling operation of the pump 230 in any suitable way on the basis of the calculated temperature value. The second control unit 210 may be adapted to deciding about a need, after cessation of an exhaust flow, to cool a reducing agent dosing unit, which forms part of the SCR system, by means of reducing agent supplied to the dosing unit, and to predicting a temperature pattern of said dosing unit as a basis for deciding about said need, and to predicting whether a predetermined temperature of the dosing unit will be reached after said cessation of exhaust flow.

It should be noted that the innovative method may be applied by the first control unit 200 and the second control unit 210, or by both the first control unit 200 and the second control unit 210.

According to the embodiment schematically illustrated in FIG. 2, the first control unit 200 is adapted to controlling operation of the pump 230 at reduced power compared with ordinary operation, after cessation of an exhaust flow from the engine, in such a way that any amount of electrical energy which may be needed for cooling the dosing unit 250 to at least one critical temperature as regards safety is reduced compared with the state of the art.

Figure 3:
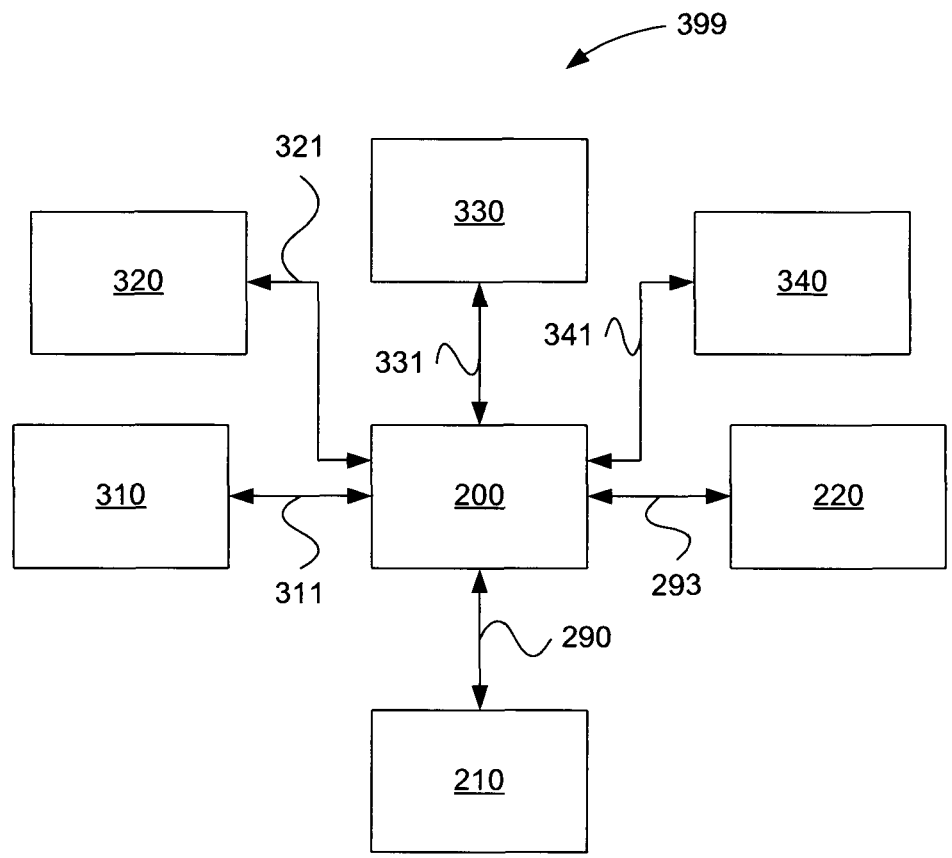
FIG. 3 illustrates schematically a subsystem for the vehicle depicted in FIG. 1, according to an embodiment of the invention.

FIG. 3 illustrates schematically a subsystem 399 of the vehicle 100. The subsystem 399 comprises certain components described above with reference to FIG. 2, e.g. the first control unit 200, the second control unit 210 and the temperature sensor 220 for detecting a prevailing temperature of the reductant in the container 205.

The subsystem 399 comprises a temperature sensor 310 adapted to measuring a prevailing temperature of exhaust gases in an exhaust system upstream of the SCR catalyst. The temperature sensor 310 is arranged for communication with the first control unit via a link 311. The temperature sensor 310 is adapted to continuously sending to the first control unit 200 via the link 311 signals which contain information about a prevailing temperature of the exhaust flow. The first control unit 200 is adapted, according to a version, to estimating a prevailing temperature of the SCR catalyst on the basis of the signals received which contain information about a prevailing temperature of the exhaust flow.

The subsystem 399 comprises a temperature sensor 320 adapted to measuring a prevailing temperature of the SCR catalyst. The temperature sensor 320 is arranged for communication with the first control unit via a link 321. The temperature sensor 320 is adapted to continuously sending to the first control unit 200 via the link 321 signals which contain information about a prevailing temperature of the SCR catalyst.

The subsystem 399 comprises a temperature sensor 330 adapted to measuring a prevailing temperature of the dosing unit 250. The temperature sensor 330 is arranged for communication with the first control unit via a link 331. The temperature sensor 330 is adapted to continuously sending to the first control unit 200 via the link 331 signals which contain information about a prevailing temperature of the dosing unit 250.

The subsystem 399 comprises a flow sensor 340 adapted to measuring a prevailing flow of the reductant in the SCR system. The flow sensor 340 may be situated at any location in the SCR system, e.g. adjacent to the line 273 downstream of the dosing unit 250. The flow sensor 340 is arranged for communication with the first control unit via a link 341. The flow sensor 340 is adapted to continuously sending to the first control unit 200 via the link 341 signals which contain information about a prevailing flow of the reductant.

The signals sent by the respective sensors 310, 320, 330, 340 and 220 may be used by the first control unit to model a temperature pattern of the dosing unit 250 according to an aspect of the invention. According to a version, the first control unit 200 is adapted to modelling a temperature pattern of the dosing unit 250 on the basis of information in at least one of the signals received from the respective sensors 310, 320, 330, 340 and 220.

Figure 4:
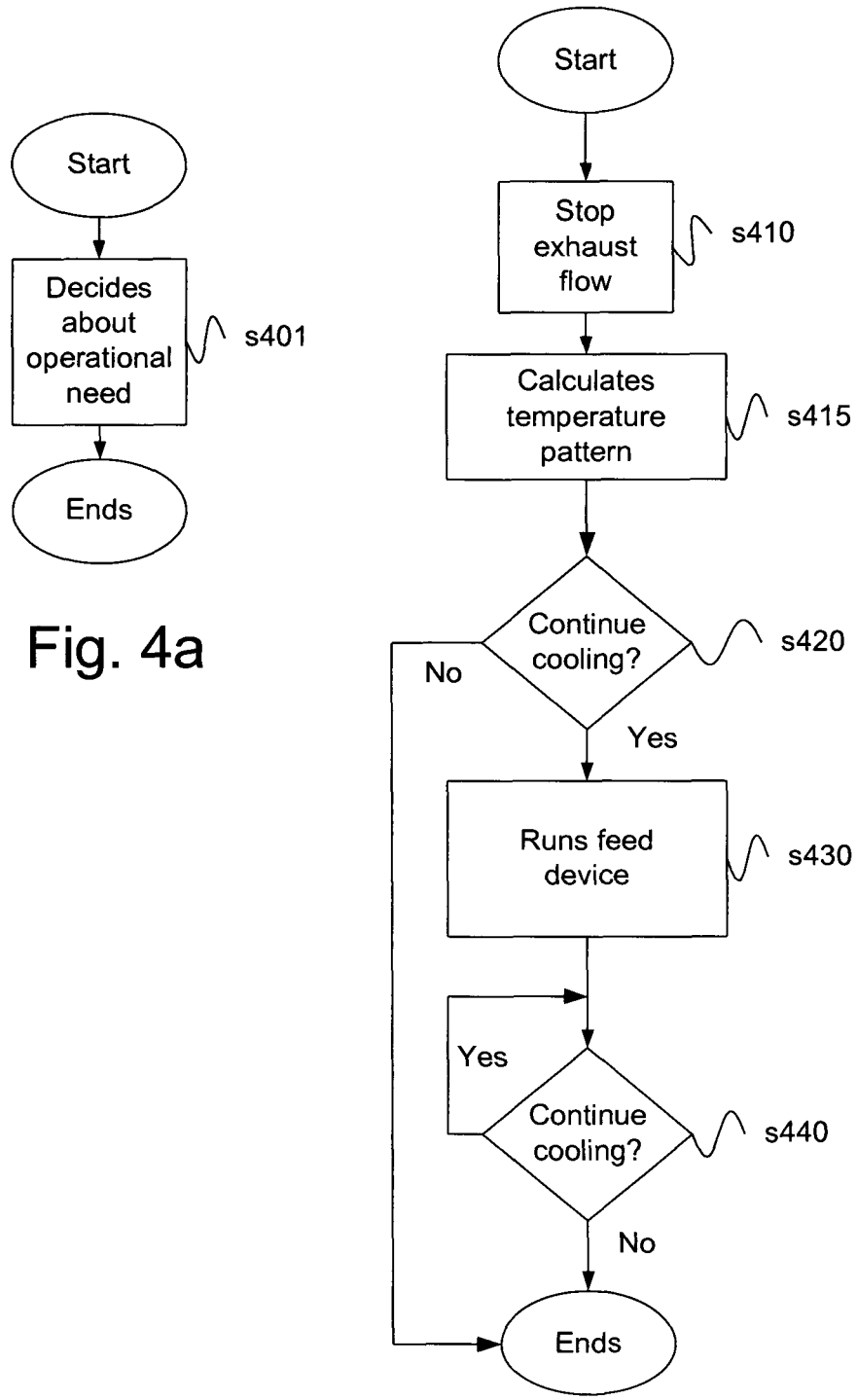
FIG. 4$a$ is a schematic flowchart of a method according to an embodiment of the invention.

FIG. 4a is a schematic flowchart of a method pertaining to SCR systems for exhaust cleaning, according to an embodiment of the invention. The method comprises a first step s401. Method step s401 comprises the step of deciding about a need, after cessation of an exhaust flow, to cool a reducing agent dosing unit, which forms part of said SCR system, by means of reducing agent supplied to the dosing unit, and the step of:

predicting a temperature pattern of the dosing unit as a basis for deciding about said need, and accordingly predicting whether a predetermined temperature of the dosing unit will be reached after said cessation of exhaust flow. The method ends after step s401.

FIG. 4b is a schematic flowchart of a method pertaining to SCR systems for exhaust cleaning, according to an embodiment of the invention.

The method comprises a first step s410. Method step s410 comprises the step of shutting off an exhaust flow from a combustion engine of the vehicle 100. At this stage, the dosing unit 250 is cooled in an ordinary way, i.e. at an operating power of the pump 230 which is needed to maintain substantially the same cooling flow of the dosing unit as during ordinary operation. Shutting off the exhaust flow is effected by switching off the engine of the vehicle 100. Step s410 is followed by a step s415.

Method step s415 comprises the step of calculating a future temperature pattern of the dosing unit 250 by means of a calculation model which is stored in the first control unit 200 or the second control unit 210. The calculation of the temperature pattern may be based on one or more of various parameters, e.g. a prevailing temperature of the vehicle's SCR catalyst, a prevailing temperature of the reductant, a flow of the reductant in the SCR system, a prevailing temperature of the vehicle's silencer, a prevailing temperature of the dosing unit 250, temperatures of an exhaust flow before its cessation and/or a parameter related to estimated engine load during a certain time before cessation of said exhaust flow. The calculation model is adapted to calculating a prevailing amount of energy stored in various portions of the SCR system in order on the basis thereof to calculate and hence predict a temperature pattern of the dosing valve 250 as a basis for deciding about a need to cool the dosing unit 250. Calculating a future temperature pattern of the dosing unit 250 also makes it possible to determine what maximum temperature the dosing unit 250 might reach if cooling does not continue or is discontinued after the cessation of the exhaust flow. Determining a modelled value for a maximum future temperature of the dosing unit 250 makes it possible for operation of the pump 230 to be controlled in an optimum way on the basis thereof. Step s415 is followed by a step s420.

Method step s420 comprises the step of evaluating whether there is a continuing need to cool the dosing unit by means of a flow of the reductant in the SCR system. The step of deciding whether there is a need to continue said cooling may be based on the modelled value determined for maximum future temperature of the dosing unit 250. According to an example, deciding whether there is a continuing need for cooling is based on the signals from at least one from among the sensor 220, the sensor 310, the sensor 320, the sensor 330 and the sensor 340, which contain information as described above with reference to FIG. 3. If there is no continuing need for cooling, the method ends. If there is a continuing need for cooling, a subsequent step s430 is performed.

Method step s430 comprises the step of influencing the operation of the pump 230 in such a way that it is run intermittently and/or at reduced operating power compared with ordinary operation. According to a version, the pump 230 is run intermittently with a predetermined interval configuration. According to a version, the pump 230 is run intermittently at an operating power corresponding to ordinary operation. According to a version, the pump 230 is run intermittently at a reduced operating power compared with that employed for maintaining a cooling flow of the dosing unit 250 during ordinary operation. Step s430 is followed by a step s440.

Method step s440 comprises the step of evaluating whether there is a continuing need to continue cooling the dosing unit by means of a flow of the reducing agent in the SCR system. The step of deciding whether there is a need to continue said cooling may be based on an updated modelled value for maximum future temperature of the dosing unit 250. According to a version, the calculation model is adapted to continuously updating a modelled value determined for the future maximum temperature of the dosing unit 250. Calculating an updated value for said maximum temperature may be done in substantially the same way as described, for example, with reference to method step s415. According to an example, deciding whether there is a continuing need for cooling is based on the signals from at least one from among the sensor 220, the sensor 310, the sensor 320, the sensor 330 and the sensor 340, which contain information as described above with reference to FIG. 3. If there is found to be no continuing need for cooling, the method ends. If there is found to be a continuing need for cooling, operation of the pump 230 continues in any way appropriate to ensuring effective cooling of the dosing unit 250. For example, the pump 230 may continue to be run intermittently, possibly also at reduced operating power compared with ordinary operation.

Figure 5:
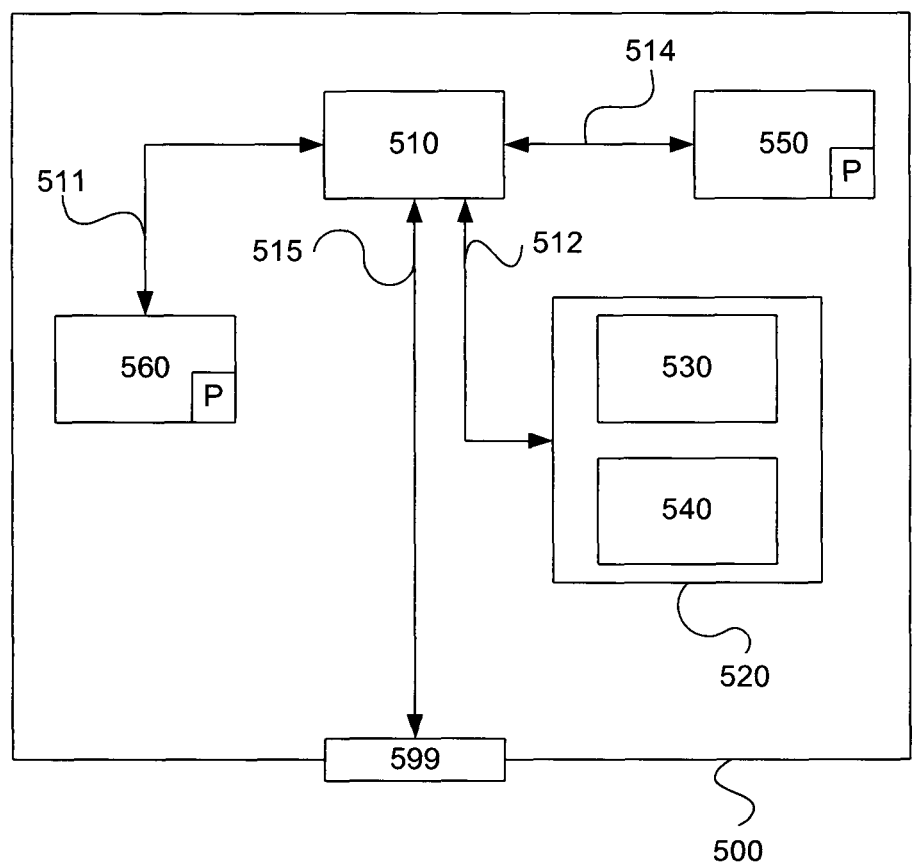
FIG. 5 illustrates schematically a computer according to an embodiment of the invention.

FIG. 5 is a diagram of a version of a device 500. The control units 200 and 210 described with reference to FIG. 2 may in a version comprise the device 500. The device 500 comprises a non-volatile memory 520, a data processing unit 510 and a read/write memory 550. The non-volatile memory 520 has a first memory element 530 in which a computer programme, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

A proposed computer programme P comprises routines for deciding about a need, after cessation of an exhaust flow, to cool a reducing agent dosing unit, which forms part of the SCR system, by means of reducing agent supplied to the dosing unit, and for predicting a temperature pattern of said dosing unit as a basis for deciding about said need, and for predicting accordingly whether a predetermined temperature of the dosing unit will be reached after said cessation of exhaust flow, according to the innovative method. The programme P may be stored in an executable form or in a compressed form in a memory 560 and/or in a read/write memory 550.

Where the data processing unit 510 is described as performing a certain function, it means that the data processing unit 510 effects a certain part of the programme stored in the memory 560, or a certain part of the programme stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicating with the data processing unit 510 via a data bus 514. The data port 599 may for example have the links 311, 321, 331, 341, 293 and 290 connected to it (see FIG. 3).

When data are received on the data port 599, they are stored temporarily in the second memory element 540. When input data received have been temporarily stored, the data processing unit 510 is prepared to effect code execution as described above. According to a version, signals received on the data port 599 contain information about a prevailing temperature of an SCR catalyst of the vehicle 100. According to a version, signals received on the data port 599 contain information about a prevailing temperature of the reductant in the SCR system. According to a version, signals received on the data port 599 contain information about a prevailing flow of the reductant, e.g. in the line 273. According to a version, signals received on the data port 599 contain information about a prevailing temperature of the dosing unit 250 of the SCR system. According to a version, signals received on the data port 599 contain information about a prevailing temperature of an exhaust flow in the exhaust system of the vehicle 100.

The signals received on the data port 599 may be used by the device 500 to decide by means of a calculation model stored in the device 500 about a need, after cessation of an exhaust flow, to cool a reducing agent dosing unit, which forms part of the SCR system, by means of reducing agent supplied to the dosing unit, and to predict a temperature pattern of the dosing unit as a basis for deciding about said need, and to predict accordingly whether a predetermined temperature of the dosing unit will be reached after said cessation of exhaust flow.

Parts of the methods herein described may be effected by the device 500 by means of the data processing unit 510 which runs the programme stored in the memory 560 or the read/write memory 550. When the device 500 runs the programme, methods herein described are executed.

The foregoing description of the preferred embodiments of the present invention is provided for illustrative and descriptive purposes. It is not intended to be exhaustive or to restrict the invention to the variants described. Many modifications and variations will obviously be apparent to one skilled in the art. The embodiments have been chosen and described in order best to explain the principles of the invention and its practical applications and hence make it possible for specialists to understand the invention for various embodiments and with the various modifications appropriate to the intended use.

The invention claimed is:

1. A method pertaining to an SCR system for exhaust cleaning of an engine which generates exhaust when the engine operates; a reducing agent dosing valve, which forms part of the SCR system, for receiving a supply of a reducing agent to the dosing valve;

the method comprising the steps of:
operating the engine and generating an exhaust flow, and then halting the engine and ceasing the generation of an exhaust flow;
before cessation of an exhaust flow, deciding about a need to cool the reducing agent dosing valve by supplying reducing agent to the dosing valve;
predicting a temperature pattern of said dosing valve as a basis for deciding about said need, and accordingly predicting whether a predetermined temperature of said dosing valve will be reached after said cessation of exhaust flow.

2. The method according to claim 1, wherein said predetermined temperature is a functionally critical temperature for said dosing valve.

3. A method according to claim 1, further comprising a temperature pattern of at least one further portion of said SCR system comprises at least one from among an SCR catalyst, a silencer and the reducing agent is predicted.

4. A method according to claim 3, further comprising using said prediction of said temperature pattern of said at least one portion of said SCR system for indirect determination of a future temperature of said dosing valve.

5. A method according to claim 1, wherein said prediction of said temperature pattern entails catering for rewarming effects of at least one portion of said SCR system.

6. A method according to claim 1, further comprising the step of: predicting said temperature pattern of at least one said portion of said SCR system by a calculation model comprising a predetermined parameter configuration.

7. A method according to claim 6, wherein said step of deciding about said need is performed before said cessation of exhaust flow or after said cessation of exhaust flow.

8. A method according to claim 1, wherein said reducing agent is a fluid solution which contains urea.

9. An SCR system of an engine which generates exhaust, when the engine operates, a reducing agent dosing valve for exhaust cleaning and which forms part of the SCR system, which receives a supply of a reducing agent to said dosing valve;

the system further comprising:
a control unit that includes a processor configured to decide about a need to cool said reducing agent dosing valve after cessation of an exhaust flow by reducing agent intended to be supplied to said dosing valve, and configured to predict a temperature pattern of said dosing valve as a basis for deciding about said need to cool said dosing valve, and configured to predict whether a predetermined temperature of said dosing valve will be reached after said cessation of exhaust flow.

10. An SCR system according to claim 9, in which said predetermined temperature is a functionally critical temperature for said dosing valve.

11. An SCR system according to claim 9, wherein said processor is configured to predict a temperature pattern of at least one further portion of said SCR system which portion comprises at least one of an SCR catalyst, a silencer or said reducing agent.

12. An SCR system according to claim 9, wherein said prediction of a temperature pattern of said at least one portion of said SCR system is for determining indirectly a future temperature of said dosing valve.

13. An SCR system according to claim 9, wherein said prediction of said temperature pattern entails catering for rewarming effects of at least one portion of the SCR system.

14. An SCR system according to claim 9, wherein said processor is configured to predict said temperature pattern of at least one portion of said SCR system by a calculation model comprising a predetermined parameter configuration.

15. An SCR system according to claim 14, wherein said processor is configured and operable to decide about the need to cool said reducing agent dosing valve before said cessation of exhaust flow.

16. An SCR system according to claim 9, wherein said reducing agent is a fluid solution which contains urea.

17. A motor vehicle comprising an SCR system according to claim 9.

18. A motor vehicle according to claim 17, comprising a truck, bus or passenger car.

19. A computer program product pertaining to an SCR system for exhaust cleaning of an engine, wherein said program product comprises non-transitory program code with non-transitory program instructions for causing a computer system to perform steps according to claim 1 on an electronic control unit or causing another computer connected to the electronic control unit to perform such steps when instructions in said code are run on said computer.

20. A computer program product according to claim 19, wherein product contains a program code stored on a non-transitory computer-readable medium which can be read by said computer system for performing method steps when said computer program is run on an electronic control unit or another computer connected to said electronic control unit.

* * * * *